US007756996B2

(12) United States Patent
Touboul

(10) Patent No.: US 7,756,996 B2
(45) Date of Patent: Jul. 13, 2010

(54) EMBEDDING MANAGEMENT DATA WITHIN HTTP MESSAGES

(75) Inventor: Shlomo Touboul, Kefar-Haim (IL)

(73) Assignee: Finjan, Inc., San Jose, CA (US)

( * ) Notice: Subject to any disclaimer, the term of this patent is extended or adjusted under 35 U.S.C. 154(b) by 1931 days.

(21) Appl. No.: 10/768,920

(22) Filed: Jan. 30, 2004

(65) Prior Publication Data

US 2005/0172324 A1    Aug. 4, 2005

(51) Int. Cl.
    *G06F 15/16*    (2006.01)
(52) U.S. Cl. .................. 709/236; 709/230; 709/238
(58) Field of Classification Search ......... 709/230, 709/236, 238, 218
    See application file for complete search history.

(56) References Cited

U.S. PATENT DOCUMENTS

| 6,401,116 | B1 * | 6/2002 | Okigami ................ 709/223 |
| 6,687,732 | B1 * | 2/2004 | Bector et al. ............ 709/200 |
| 6,873,988 | B2 * | 3/2005 | Herrmann et al. ........ 707/10 |
| 7,107,309 | B1 * | 9/2006 | Geddes et al. ........... 709/203 |
| 7,130,919 | B1 * | 10/2006 | Dickhaus ............... 709/238 |
| 7,251,631 | B2 * | 7/2007 | Drummond et al. ........ 705/43 |
| 7,272,642 | B2 * | 9/2007 | Knight et al. ........... 709/218 |
| 7,274,711 | B2 * | 9/2007 | Kajizaki et al. .......... 370/473 |
| 7,277,914 | B2 * | 10/2007 | Takeshima et al. ....... 709/203 |
| 7,287,278 | B2 * | 10/2007 | Liang .................... 726/22 |
| 2003/0081599 | A1 * | 5/2003 | Wu et al. ................ 370/389 |
| 2005/0008013 | A1 * | 1/2005 | Jamieson et al. ......... 370/389 |

* cited by examiner

*Primary Examiner*—Faruk Hamza
(74) *Attorney, Agent, or Firm*—King & Spalding LLP

(57) ABSTRACT

A system for embedding messages within HTTP streams, including a gateway communicator, situated within a network gateway computer that communicates with at least one client computer, for receiving management data intended for the at least one client computer from a management server computer that communicates with the network gateway computer, a gateway data embedder situated within the network gateway computer for inserting non-HTTP management data within an HTTP message, and a client data extractor situated within each of the at least one client computer for extracting non-HTTP management data from within an HTTP message. A method and a computer readable storage medium are also described and claimed.

7 Claims, 4 Drawing Sheets

EMBEDDING MANAGEMENT DATA WITHIN HTTP MESSAGES

FIELD OF THE INVENTION

The present invention relates to efficient delivery of management data between a network management server and a plurality of client computers.

BACKGROUND OF THE INVENTION

Network security systems often transmit security management data between a management server and a plurality of client computers over a corporate intranet, in order to protect client computers from mobile code For example, corporate anti virus software regularly sends queries from a server to clients, to ascertain which version of a signature file the clients are using, and sends signature updates to the clients, as necessary; and the clients regularly send query responses, identifying the version of their current signature file, to the server, and send event logs, such as a report about a virus discovered on a client, as necessary, to the server.

Similarly, network management applications, such as OPENVIEW®, a product of Hewlett Packard Co. of Palo Alto, Calif., and UNICENTER®, a product of Computer Associates International, Inc. of Islandia, N.Y., regularly transmit network management data between a server and clients.

Management data is typically transmitted back and forth over a network typically using a proprietary non-HTTP protocol, and thus creates additional traffic, above and beyond the HTTP traffic. Such additional traffic increases the number of packets traveling on the network, and the processing required to handle them.

SUMMARY OF THE INVENTION

The present invention provides a method and system for optimizing bandwidth utilization and request/response handling within a distributed network. As described above, network management and security systems often distribute management data from a server to a plurality of client computers over a corporate intranet. Using the present invention, the management data is embedded within HTTP messages transmitted between a network gateway or proxy, and the same plurality of client computers. The management data is encoded in such a way that it can be readily extracted from the HTTP messages received by the gateway or proxy, and the client computers. Thus the present invention enables management and security systems to "piggy back" on top of regular HTTP traffic that runs back and forth between client web browsers and a corporate gateway or HTTP proxy.

In a preferred embodiment of the present invention, HTTP traffic between a corporate gateway or proxy and a plurality of clients is intercepted at a Winsock level, and proprietary management data is embedded therewithin. The present invention also includes a method and system to extract the management data from the HTTP messages, so that (i) the management data can be processed by the client computers and by the gateway or proxy; and (ii) HTTP data forwarded by the gateway or proxy outside the corporation does not include the extra management data.

There is thus provided in accordance with a preferred embodiment of the present invention a system for embedding messages within HTTP streams, including a gateway communicator, situated within a network gateway computer that communicates with at least one client computer, for receiving management data intended for the at least one client computer from a management server computer that communicates with the network gateway computer, a gateway data embedder situated within the network gateway computer for inserting non-HTTP management data within an HTTP message, and a client data extractor situated within each of the at least one client computer for extracting non-HTTP management data from within an HTTP message.

There is further provided in accordance with a preferred embodiment of the present invention a method for embedding messages within HTTP streams, including receiving management data intended for at least one client computer, inserting non-HTTP management data within an HTTP message prior to the HTTP message being received by the at least one client computer, and extracting non-HTTP management data from within an HTTP message subsequent to the HTTP message being received.

There is yet further provided in accordance with a preferred embodiment of the present invention a computer-readable storage medium storing program code for causing a computer to perform the steps of receiving management data intended for at least one client computer, inserting non-HTTP management data within an HTTP message, and extracting non-HTTP management data from within an HTTP message.

There is moreover provided in accordance with a preferred embodiment of the present invention a system for a network gateway computer that communicates with at least one client computer, including a communicator for receiving management data intended for at least one client computer from a management server computer, and for transmitting an HTTP message to the at least one client computer, and a gateway data embedder for inserting non-HTTP management data within an HTTP message.

There is additionally provided in accordance with a preferred embodiment of the present invention a system for a client computer that communicates with a network gateway computer, including a communicator for receiving an HTTP message, and a client data extractor for extracting embedded non-HTTP management data from within an HTTP message.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

The present invention provides a method and system for efficient delivery of management data communicated between a network management server and a plurality of client computers within a network such as a corporate intranet.

Figure 1:
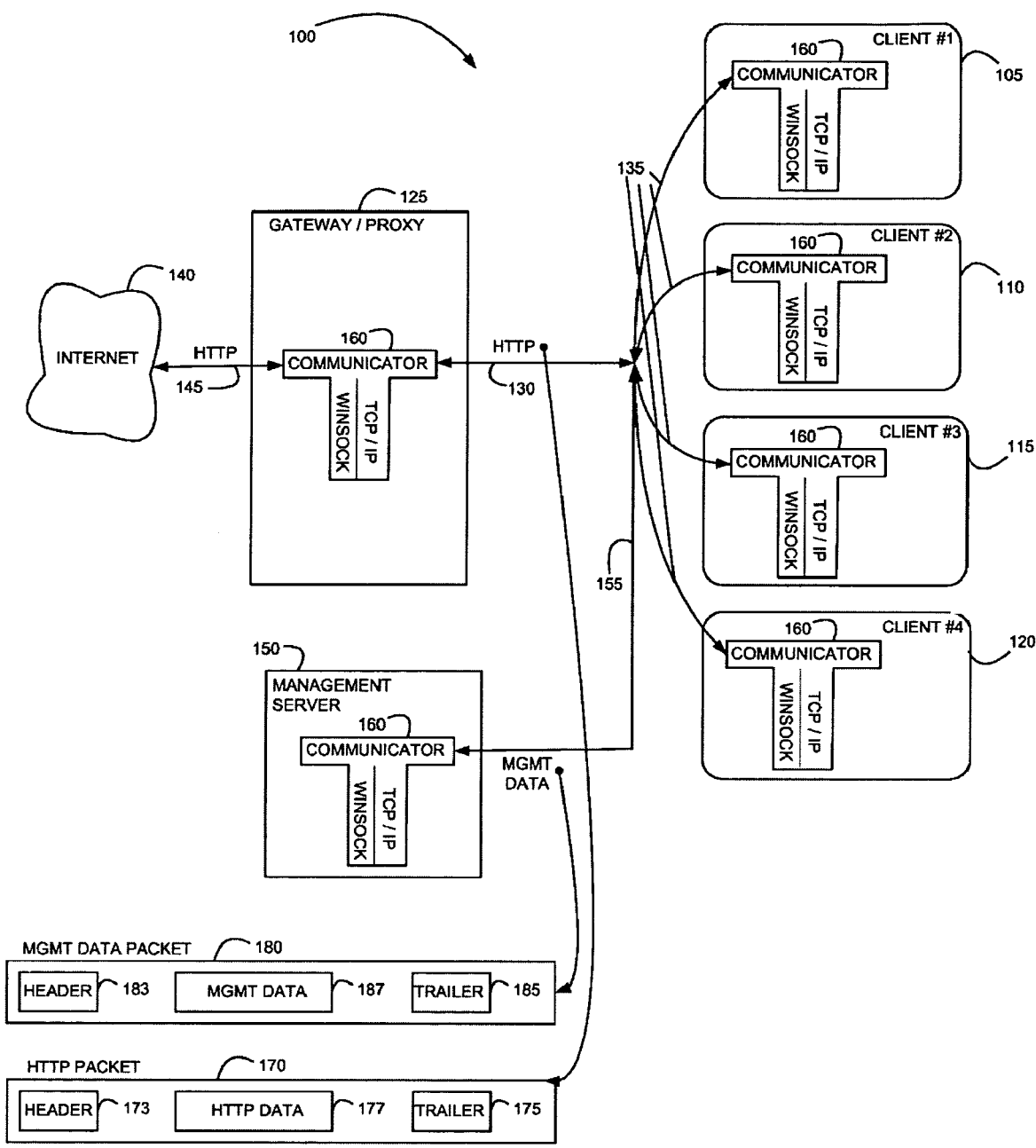
FIG. 1 is a simplified block diagram of a prior art system for transmitting management data back and forth between a management server computer and a plurality of client computers.

Reference is now made to FIG. 1, which is a simplified block diagram of a prior art system 100 for transmitting management data back and forth between a management server computer and a plurality of client computers. Shown in FIG. 1 are a plurality of client computers 105, 110, 115 and 120, within a corporate intranet, connected to a corporate gateway computer 125 via communication lines 130 and 135. Gateway computer 125 may alternatively be a proxy computer. Gateway computer 125 connects to an internet 140 via a communication line 145. Client computers 105, 110, 115 and 120 typically use web browsers to send requests and responses across the corporate intranet, and across the internet.

Also shown in FIG. 1 is a management server 150, connected to clients 105, 110, 115 and 120 via a communication line 155. Management server 150 may be, for example, (i) a network management server, for managing a corporate intranet, such as a server running OPENVIEW® software, a product of Hewlett Packard Co. of Palo Alto, Calif., or running UNICENTER® software, a product of Computer Associates International, Inc. of Islandia, N.Y.; or (ii) a network security server, for protecting a corporate intranet from unauthorized access and from malicious software. Management server 150 and clients 105, 110, 115 and 120 regularly transmit management data back and forth. Such management data may include, for example, network resource queries and responses, queries and responses to ascertain current versions of anti-virus signature files, and updated signature files.

Although communication lines 130, 135, 145 and 155 are illustrated as individual lines, it may be appreciated that they are part of one or more interconnected networks, and that transmission of data between clients 105, 110, 115 and 120, gateway 125, management server 150 and internet 140 operates by generating communication sockets within such networks. Specifically, clients 105, 110, 115 and 120, gateway 125 and management server 150 include TCP/IP and Winsock communication modules 160, for managing communication sockets.

Data traffic between gateway 125 and clients 105, 110, 115 and 120 typically includes HTTP requests and responses, between web browsers within the corporate intranet, and web servers distributed over internet 140. A typical HTTP packet 170, as shown in FIG. 1, includes one or more TCP and IP headers, indicated by data block 173, one or more TCP and IP trailers, indicated by data block 175, and a message body with HTTP data, indicated by data block 177.

Data traffic between management server 150 and clients 105, 110, 115 and 120 typically is formatted using a proprietary non-HTTP transport protocol. A typical management data packet 180, as shown in FIG. 1, includes one or more TCP and IP headers, indicated by data block 183, one or more TCP and IP trailers, indicated by data block 185, and a message body with management data, indicated by data block 187.

Prior art system 100 suffers from a drawback that management server 150 creates additional traffic, above and beyond the HTTP traffic. Such additional traffic increases the number of TCP/IP packets traveling on the network. Moreover, because TCP/IP packets generally include TCP headers and trailers, IP headers and trailers, and other data control overhead, the additional packets on the network include additional overhead as well.

Figure 2:
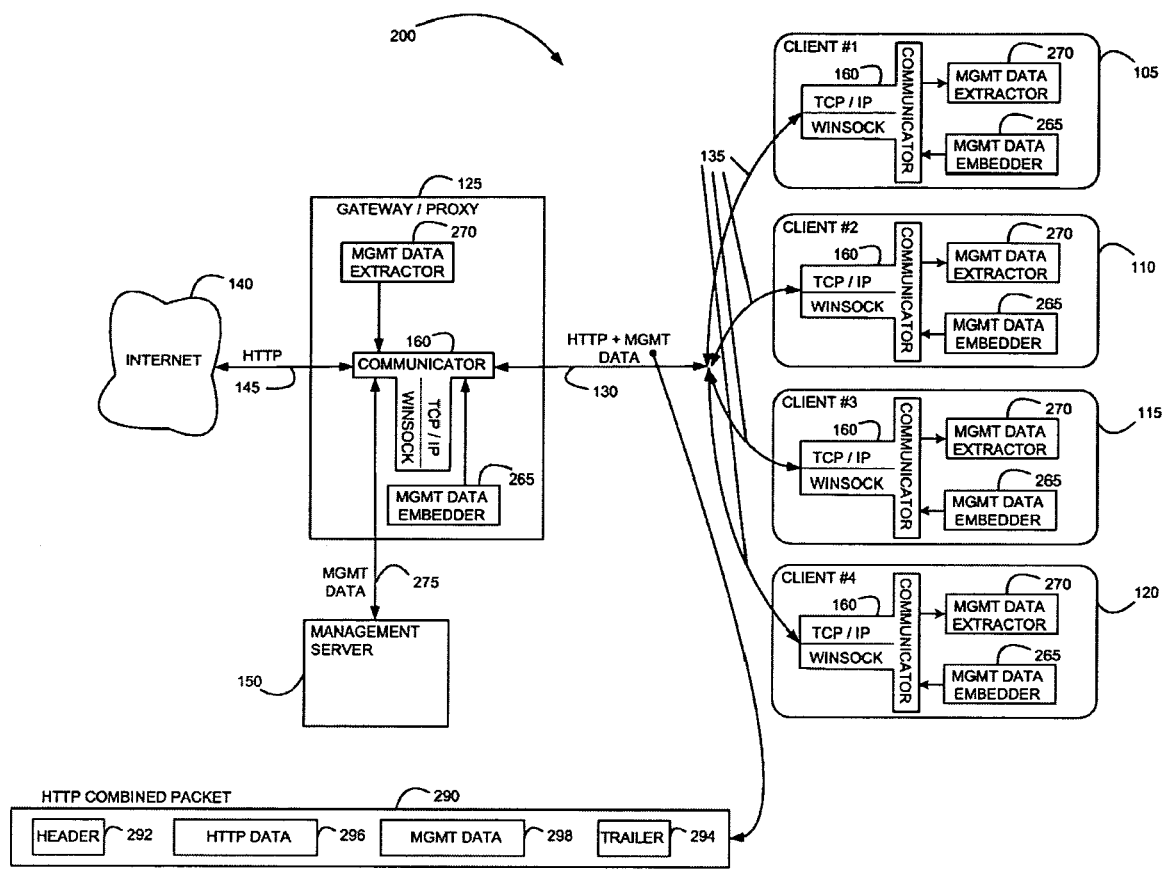
FIG. 2 is a simplified block diagram of a system for embedding messages within HTTP streams, in accordance with a preferred embodiment of the present invention.

Reference is now made to FIG. 2, which is a simplified block diagram of a system 200 for embedding messages within HTTP streams, in accordance with a preferred embodiment of the present invention. For the sake of clarifying the improvement that system 200 offers over prior art system 100, like numerals, in the 100-199 range, are used in both figures for common components, and numerals in the 200-299 range are used for components that are unique to FIG. 2.

Shown in FIG. 2 is a similar network architecture, in which client computers 105, 110, 115 and 120 are connected to gateway computer 125 and to a management server computer 150 within a corporate intranet. However, in distinction to FIG. 1, management server 150 sends and receives its management data through gateway 125. Generally, management data is formatted for transmission using a proprietary, non-HTTP protocol.

Clients 105, 110, 115 and 120, and gateway 125 include management data embedders 265 and management data extractors 270. Management data embedder 265 embeds management data within HTTP messages, and management extractor extracts the management data from the HTTP messages.

Preferably, clients 105, 110, 115 and 120 use their management data extractors 270 to extract management data sent to them by management server 150, which was packaged within HTTP messages received over communication lines 135. Preferably, clients 105, 110, 115 and 120 use their management data embedders 265 to embed management data intended for management server 150 within HTTP messages sent over communication lines 135.

Preferably, gateway 125 uses its management data embedder 265 to embed management data received from management server 150 and intended for clients 105, 110, 115 and 120, within HTTP messages sent over communication lines 135. Preferably, gateway 125 uses its management data extractor 270 to extract management data packaged within HTTP messages received over communication lines 135. The extracted management data is forwarded by gateway 125 to management server 150, and the HTTP messages without the management data are forwarded to their indicated destination on internet 140.

Preferably, management server 150 sends and receives management data over a communication line 275 between management server 150 and gateway 125, instead of directly over communication lines 135, as in FIG. 1. As shown in FIG. 2, HTTP packets 290 traveling over communication lines 130 and 135 that contain combined HTTP+management data include TCP/IP header data 292, TCP/IP trailer data 294, and a body that includes both HTTP data 296 and management data 298. Thus it may be appreciated that packets 290 of FIG. 2 replace packets 170 and 180 of FIG. 1.

Although the same management data goes back and forth between management server 150 and clients 105, 110, 115 and 120, both in prior art system 100 and in system 200 of the present invention, the routing indicated in FIG. 2 has several advantages. In particular, using the present invention:

the number of packets sent over the intranet is reduced;
overall traffic volume is reduced, since the additional packets sent using system 100 include header, trailer and other control data overhead; and
processing for handling TCP/IP requests and responses is reduced.

It may be appreciated that management server 150 may also send proprietary non-HTTP data to clients 105, 110, 115 and 120 along communication line 155 (FIG. 1), as necessary. Thus direct communication along line 155 is still available using the present invention, if required.

Figure 3:
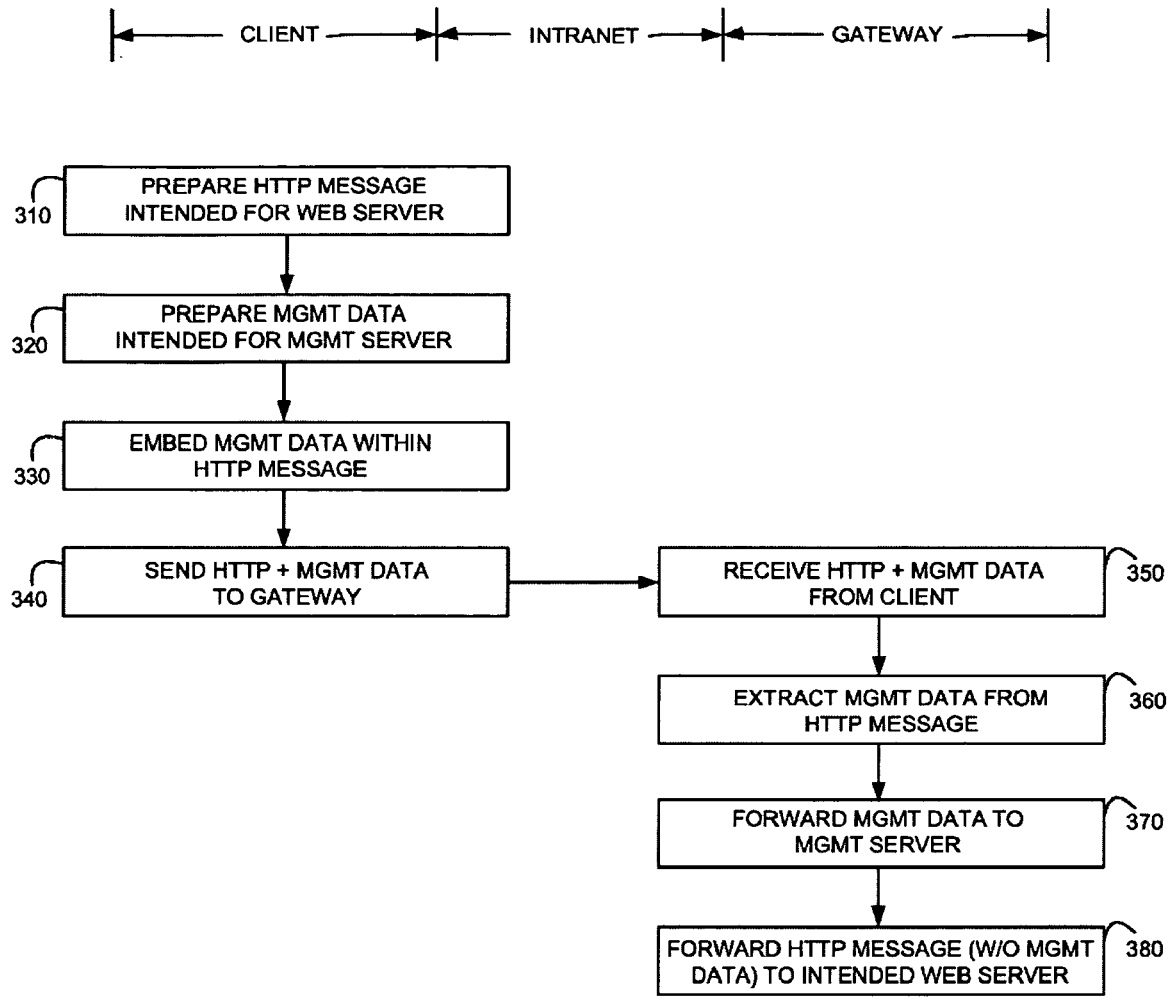
FIG. 3 is a simplified flowchart of a method for transmitting management data within an HTTP message sent by a client, in accordance with a preferred embodiment of the present invention.

Reference is now made to FIG. 3, which is a simplified flowchart of a method for transmitting management data within an HTTP message sent by a client, in accordance with a preferred embodiment of the present invention. The flowchart shown in FIG. 3 is divided into two columns, the left column indicating steps performed by a client, and the right column indicating steps performed by a network gateway.

At step 310 the client prepares an HTTP message for transmission to a web server. At step 320 the client prepares non-HTTP management data for transmission to a management server. Rather than send the HTTP message and non-HTTP management data as separate messages, at step 330 the client embeds the management data within the HTTP message. In one embodiment, the structure for performing step 330 is management data embedder 265 (FIG. 2). At step 340 the client sends the HTTP message, now including the management data embedded therein, to the web server.

On its way to the web server, the HTTP message first passes through the gateway, and is received by the gateway at step 350. At step 360 the gateway extracts the non-HTTP management data from within the HTTP message. In one embodiment, the structure for performing step 360 is management data extractor 270 (FIG. 2). The gateway reconstructs the original HTTP message, without the management data. At step 370 the gateway sends the management data to the management server, and at step 380 the gateway sends the HTTP message, without the management data, to the intended web server.

Figure 4:
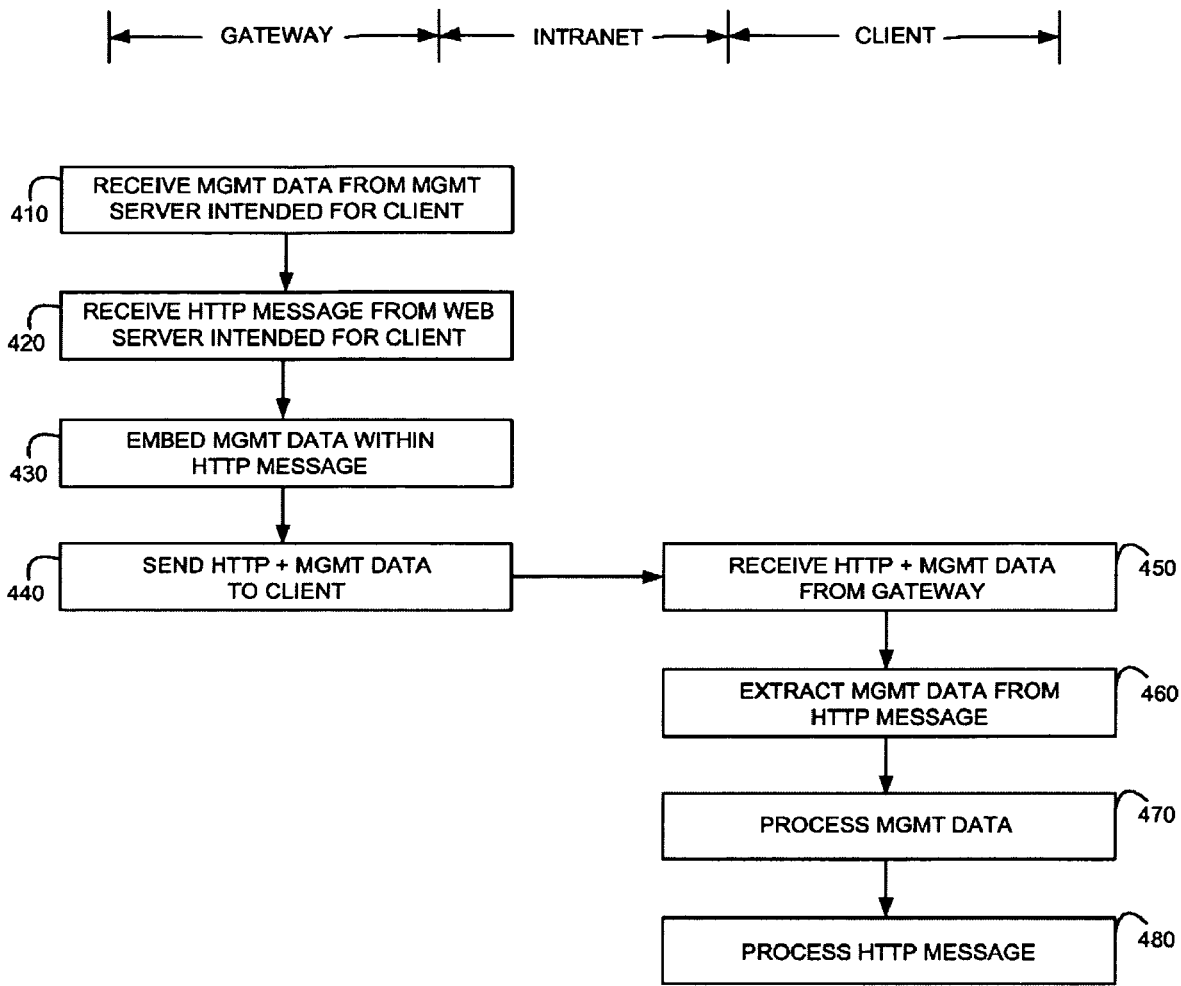
FIG. 4 is a simplified flowchart of a method for transmitting management data within an HTTP message sent by a network gateway, in accordance with a preferred embodiment of the present invention.

Reference is now made to FIG. 4, which is a simplified flowchart of a method for transmitting management data within an HTTP message sent by a network gateway, in accordance with a preferred embodiment of the present invention. The flowchart shown in FIG. 4 is divided into two columns, the left column indicating steps performed by a network gateway, and the right column indicating steps performed by a client.

At step 410 the gateway receives non-HTTP management data intended for one or more clients, from a management server. At step 420 the gateway receives an HTFP message from a web server, on its way to a client. At step 430 the gateway embeds the non-HTTP management data within the HTTP message. In one embodiment, the structure for performing step 430 is management data embedder 265 (FIG. 2). At step 440 the gateway forwards the HTTP message, now including the management data, to the intended client.

At step 450 the client receives the HTTP message, and at step 460 the client extracts the non-HTTP management data from within the HTTP message. In one embodiment, the structure for performing step 460 is management data extractor 270 (FIG. 2). At step 470 the client processes the management data, as required, and at step 480 the client processes the HTTP message, as required.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A system for embedding management data within HTTP messages, comprising:
   a network gateway computer storing a gateway communicator configured to communicate with at least one client computer, for receiving (i) a server-originated HTTP message intended for the at least one client computer from an HTTP server computer that communicates with the network gateway computer, and (ii) server-originated non-HTTP management data intended for the at least one client computer from a management server computer that communicates with the network gateway computer;
   the network gateway computer storing a gateway data embedder configured to insert the server-originated non-HTTP management data within the server-originated HTTP message;
   the at least one client computer storing a client data extractor configured to extract the server-originated non-HTTP management data from within the server-originated HTTP message;
   the at least one client computer storing a client data embedder configured to insert client-originated non-HTTP management data within a client-originated HTTP message; and
   the network gateway computer storing a gateway data extractor configured to extract the client-originated non-HTTP management data from the client-originated HTTP message; and
   wherein the gateway communicator transmits the extracted client-originated non-HTTP management data to the management server computer.

2. The system of claim 1 wherein the server-originated and the client-originated non-HTTP management data is corporate intranet management data.

3. The system of claim 1 wherein the server-originated and the client-originated non-HTTP management data is corporate security management data.

4. A method for embedding management data within HTTP messages, comprising:
   receiving server-originated non-HTTP management data from a management server computer intended for at least one client computer;
   inserting the server-originated non-HTTP management data within a server-originated HTTP message prior to the server-originated HTTP message being transmitted to the at least one client computer;
   extracting the server-originated non-HTTP management data from within the server-originated HTTP message subsequent to the server-originated HTTP message being received by the at least one client computer;
   receiving a client-originated HTTP message, the client-originated HTTP message having client-originated non-HTTP management data embedded therewithin;
   extracting the client-originated non-HTTP management data from the client-originated HTTP message; and
   transmitting the client-originated non-HTTP management data to the management server computer.

5. The method of claim 4 wherein the server-originated and the client-originated non-HTTP management data is corporate intranet management data.

6. The method of claim 4 wherein the server-originated and the client-originated non-HTTP management data is corporate security management data.

7. A computer-readable storage medium storing program code for causing a computer system to perform the steps of:
   receiving non-HTTP management data intended for at least one client computer;
   inserting the non-HTTP management data within an HTTP message prior to the HTTP message being transmitted to the at least one client computer;
   extracting the non-HTTP management data from within the HTTP message subsequent to the HTTP message being received by the at least one client computer;

receiving a client-originated HTTP message, the client-originated HTTP message having client-originated non-HTTP management data embedded therewithin;

extracting the client-originated non-HTTP management data from the client-originated HTTP message; and transmitting the client-originated non-HTTP management data to the management server computer.

* * * * *